United States Patent [19]
Rekai

[11] 3,882,887
[45] May 13, 1975

[54] OPTICAL SELF-CHECKING LEVEL DETECTOR

[75] Inventor: Andre Rekai, Scarborough, Ontario, Canada

[73] Assignee: Honeywell Inc., Minneapolis, Minn.

[22] Filed: Oct. 31, 1973

[21] Appl. No.: 411,587

[30] Foreign Application Priority Data
Feb. 26, 1973 Canada.............................. 164562

[52] U.S. Cl............... 137/386; 137/558; 340/244 R
[51] Int. Cl............................................. F16k 37/00
[58] Field of Search .......... 137/386, 389, 392, 393, 137/551, 558; 250/227; 340/237 S, 244 R; 73/293, 327; 116/118

[56] References Cited
UNITED STATES PATENTS

| 3,120,125 | 2/1964 | Vasel | 73/293 |
| 3,384,885 | 5/1968 | Forbush | 340/244 R |
| 3,485,262 | 12/1969 | Perren | 137/386 |
| 3,555,532 | 1/1971 | White et al. | 340/237 S |

*Primary Examiner*—Martin P. Schwadron
*Assistant Examiner*—David R. Matthews
*Attorney, Agent, or Firm*—Trevor B. Joike; Henry L. Hanson

[57] ABSTRACT

An optical self-checking level detector, i.e., particularly useful for detecting the level of a liquid, comprises a source of pulsating light, a prism located in the container and positioned at the level to be sensed, optical fiber for transmitting the light both to the prism from the source and from the prism to a sensor, and an integratoramplifier circuit for detecting the cessation of light pulses from the source to control a load.

10 Claims, 3 Drawing Figures

OPTICAL SELF-CHECKING LEVEL DETECTOR

This invention relates to a safety system for preventing overfill of a container.

When tank trucks used for hauling flammable liquids are filled, it is advantageous from a safety standpoint as well as from a control standpoint to sense the level of the liquid. Overfilling of such a vehicle or container involves not only waste but a danger of the liquid exploding due to sparks, static electricity or other forms of ignition. It would, of course, be possible for the operator of the filling pumps to make a visual survey of the liquid level of the tank. However, inflammable fluid handling vehicles are often compartmentalized making visual observation of a plurality of tanks impossible or at least very difficult. Also, there may not be the necessary personnel in attendance to supervise the filling operation.

It thus becomes apparent that some form of automatic liquid level control or detection is necessary to supervise the filling operation. The system must also be reliable in view of the grave consequences which could result should the supervisory system fail.

Therefore, the purpose of this invention is to establish a reliable and safe system for supervising the filling of a container and particularly the filling of a container with a dangerous or flammable fluid.

The invention and the operation thereof will readily be understood when reading the specification in connection with the accompanying drawings in which.

Figure 1:
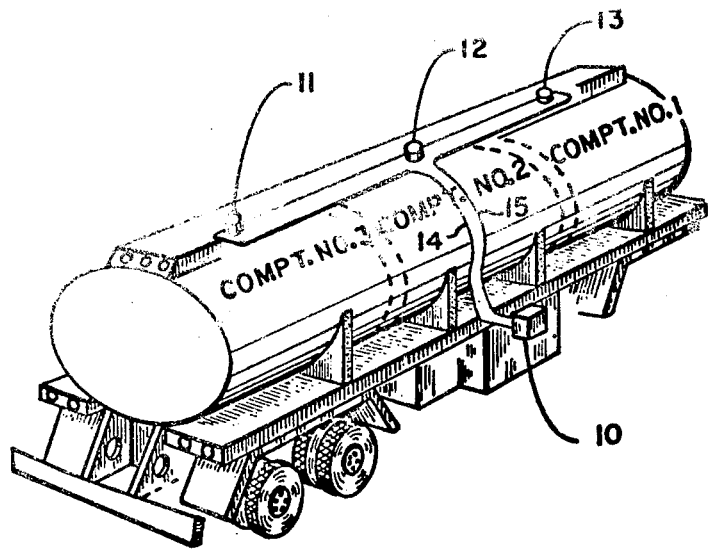
FIG. 1 is a diagrammatic view showing a tank truck and generally the control system mounted thereon.

In FIG. 1 is shown a tank trailer having three compartments for the storage and transportation of liquids which may be of a dangerous nature. A control box 10 is mounted on the side of the trailer and is connected to the sensing heads 11, 12 and 13 by optical fibers 14 and 15. Pulsating light from control box 10 is carried over optical fiber 14 to the serially connected sensors mounted in control heads 11, 12 and 13. The light is then returned to control box 10 over optical fiber 15.

The control heads 11, 12 and 13 may be prisms mounted on the end of an adjustable support (not shown) and secured to the top of the tank trailer.

Figure 2:
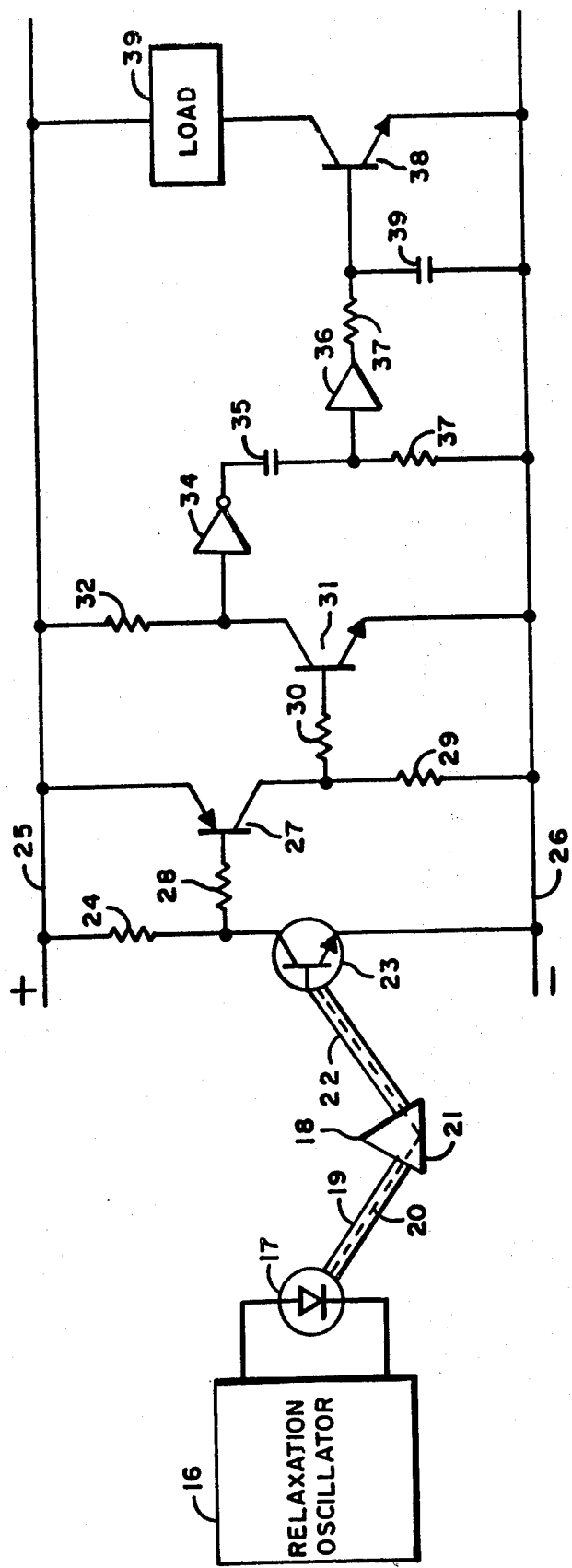
FIG. 2 is a schematic diagram of the control circuitry.

The control system is shown in more detail in FIG. 2; however, only one prism is shown. Indeed, the system may be utilized with only one prism or with a plurality of series connected prisms.

A relaxation oscillator 16 or any other form of pulsing means supplies pulsating energy to a light source, specifically a light emitting diode 17, to produce a pulsating light which is transmitted to a prism 18 by way of an optical fiber 19. The dashed line 20 within fiber 19 denotes the light being transmitted to the prism. The pulsating light from fiber 19 reflects off the surface 21 of prism 18 and is picked up by optical fiber 22. Provided the prism is surrounded by air, the index of refraction at surface 21 of the prism 18 is such as to allow the light to be reflected to fiber 22. However, if liquid impinges upon the surface 21 of prism 18, the index of refraction at surface 21 will be altered and the light 20 will pass through the prism and into the liquid without being reflected to the fiber 22.

With the liquid below surface 21, however, the light will reflect from that surface and be transmitted by optical fiber 22 to the photo-transistor 23. The collector of transistor 23 is connected through a resistor 24 to positive line 25 whereas the emitter is connected to negative line 26. The junction of resistor 24 and the collector of transister 23 is connected to the base of transistor 27 by way of a resistor 28. The emitter of transistor 27 is connected to positive line 25 whereas the collector is connected through a resistor 29 to negative line 26. The junction of the collector of transistor 27 and resistor 29 is connected through a resistor 30 to the base of transistor 31.

The collector of transistor 31 is connected through resistor 32 to the line 25 whereas the emitter is connected directly to line 26. The collector of transistor 31 is also connected through an inverter 34 and capacitor 35 to both the input of one-shot multivibrator 36 and to line 26 through a resistor 37. The output of one-shot 36 is connected through a resistor 51 to the base of transistor 38 and through capacitor 39 to the negative line 26. The emitter of transistor 38 is directly tied to line 26 whereas the collector through a load 39 to line 25.

In operation, and assuming that the liquid level is below the prism 18, the pulsating light from light emitting diode 17 will be reflected by surface 21 of prism 18 and transmitted to the photo transistor 23. When a light pulse falls upon transistor 23, it will conduct current, thereby lowering the potential of its collector and thus allowing the conduction of transistor 27. Conduction of transistor 27 provides a high potential on its collector which turns on transistor 31. The low signal on the collector of transistor 31 when it turns on is converted to a high signal by inverter 34 and passed through capacitor 35 and amplified by a one shot multivibrator 36. When the input of amplifier 36 goes high, its output goes low preventing the charging of capacitor 39. As the pulse to the photo transistor 23 ceases, the output from one-shot 36 will go high and allow the charging of capacitor 39. However, upon the next pulse reaching transistor 23, the output from amplifier 36 will again go low allowing a portion of the charge during capacitor 39 to dissipate.

As long as pulsating light is received by transistor 23, capacitor 39 is prevented from accumulating a charge sufficient enough to turn on transistor 38 and energize the load 39. However, upon cessation of the pulsating light, the capacitor 39 will accumulate such a charge as to turn on transistor 38 and energize load 39.

It will be noted that there are a number of ways in which the light pulsations may cease. The level of liquid may be high enough to prevent reflection at surface 21, and therefore, sensor 23 will receive a continuous dark signal. A fiber may break and point towards a light source so that sensor 23 receives a continuous light signal. Or a component of the system may fail. In any of these events the load will become energized.

The load may take the form of a signal light which when energized will turn on thus giving an indication that the liquid had impinged upon prism 18' or the load may take the form of a valve which will shut off the flow of fluid into the container upon energization of transistor 38 when the liquid impinges upon the prism 18.

Figure 3:
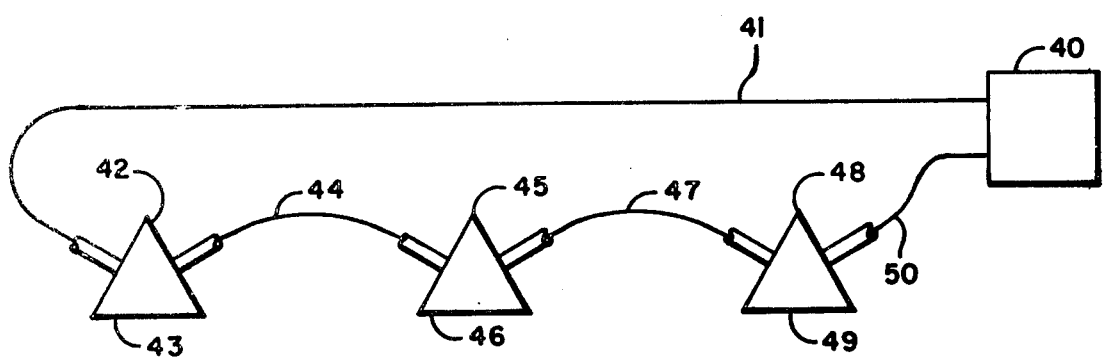
FIG. 3 shows the manner in which plural sensors are connected into the supervisory system.

If the system is used to sense a plurality of compartments, the system of FIG. 3 can be used. The control box 40 contains all of the elements between the photo-transistor 23 and load 39 of FIG. 2. It also contains the relaxation oscillator or other pulse supplying means and the light emitting diode 17. The source is then connected by way of an optical fiber 41 to the prism 42. Provided the liquid has not impinged upon surface 43, the light will be reflected by surface 43 and picked up by an optical fiber 44 and transmiteed to prism 45. If the liquid level has not impinged on the surface 46 of prism 45, the light will be reflected and picked up by optical fiber 47 and transmitted to the prism 48. As with the prisms 42 and 45, if the liquid has not impinged upon the surface 49 of the prism 48, the light supplied to prism 48 by optical fiber 47 will be reflected by the surface 49 and picked up by an optical fiber 50 and transmitted back to the photo transistor of the control box 40. Thus, liquid impinging any one of surfaces 43, 46 or 49 will break the optical path beginning over optical fiber 41 and ending at optical fiber 50. Such a break of the optical path will cause an output to be supplied to the load contained in the control circuit 40.

The embodiments of the invention in which an exclusive property or right is claimed are defined as follows:

1. An optical level sensing system for sensing the level of a material comprising:
   means for supplying pulsating light;
   light responsive sensor means;
   transmitting means for transmitting said pulses of light to said light responsive sensor only as long as said material is below a predetermined level;
   load terminals adapted to be connected to a load; and,
   output means connected to said sensor for providing an output to said load terminals only upon cessation of said pulsating light.

2. The optical level sensing system of claim 1 wherein said output means comprises amplifier means having an input connnected to said sensor and an output, and integrator means connected to said output of said amplifier means for storing energy only while said sensor fails to sense light.

3. The optical level sensing system of claim 2 wherein said means for supplying pulsating light comprises an oscillator means and a light source.

4. The optical level sensing system of claim 1 wherein said load terminals are connected to a valve means.

5. The optical level sensing system of claim 1 wherein said transmitting means comprises a prism for detecting the level of said material, a first fiber for transmitting light from said means for supplying pulsating light to said prism and a second fiber for transmitting the reflected light from said prism to said light responsive sensor means.

6. The optical level sensing system of claim 5, wherein said means for supplying pulsating light comprises an oscillator means and a light source.

7. The optical level sensing system of claim 5, wherein said output means comprises amplifier means having an input connected to said sensor and an output, and integrator means connected to said output of said amplifier means for storing energy only while said sensor fails to sense light.

8. The optical level sensing system of claim 5, wherein said prism means comprises a plurality of prisms.

9. Optical level system of claim 8 wherein said fibers connect said plurality of prisms in series.

10. The optical level sensing system of claim 9, wherein said output means comprises amplifier means having an input connected to said sensor and an output, and integrator means connected to said output of said amplifier means for storing energy only while said sensor fails to sense light.

* * * * *

UNITED STATES PATENT OFFICE
CERTIFICATE OF CORRECTION

PATENT NO. : 3,882,887
DATED : May 13, 1975
INVENTOR(S) : Andre Rekai

It is certified that error appears in the above-identified patent and that said Letters Patent are hereby corrected as shown below:

On cover page cancel "Honeywell Inc., Minneapolis, Minn." as Assignee and substitute --Honeywell Limited, Scarborough, Ontario, Canada--.

Signed and Sealed this

Twelfth Day of January 1982

[SEAL]

Attest:

Attesting Officer

GERALD J. MOSSINGHOFF

Commissioner of Patents and Trademarks